US007013650B2

(12) United States Patent
Mandet

(10) Patent No.: US 7,013,650 B2
(45) Date of Patent: Mar. 21, 2006

(54) FLEXIBLE FLAP FOR A VARIABLE-SECTION TURBOMACHINE NOZZLE

(75) Inventor: Emmanuel Mandet, Echouboulains (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/885,479

(22) Filed: Jul. 7, 2004

(65) Prior Publication Data

US 2005/0022532 A1  Feb. 3, 2005

(30) Foreign Application Priority Data

Jul. 8, 2003  (FR) .................................. 03 08311

(51) Int. Cl.
F02K 1/00 (2006.01)
(52) U.S. Cl. ...................... 60/771; 60/232; 239/265.19
(58) Field of Classification Search ............... 60/771, 60/230, 232; 239/265.19, 265.33, 265.37, 239/265.39, 265.35, 265.41
See application file for complete search history.

(56) References Cited

U.S. PATENT DOCUMENTS

| 4,637,550 | A | | 1/1987 | Nash | |
|---|---|---|---|---|---|
| 4,662,566 | A | | 5/1987 | Honeycutt, Jr. | |
| 4,994,660 | A | * | 2/1991 | Hauer | 239/265.41 |
| 5,000,386 | A | | 3/1991 | Lybarger | |
| 5,039,014 | A | * | 8/1991 | Lippmeier | 239/265.39 |
| 5,076,496 | A | * | 12/1991 | Lippmeier | 239/265.41 |
| 5,215,256 | A | * | 6/1993 | Barcza | 239/265.39 |
| 5,215,257 | A | | 6/1993 | Barcza | |
| 5,238,189 | A | * | 8/1993 | Barcza | 239/265.39 |
| 5,261,605 | A | * | 11/1993 | McLafferty et al. | 239/265.35 |
| 5,269,467 | A | * | 12/1993 | Williams et al. | 239/265.41 |
| 5,484,105 | A | * | 1/1996 | Ausdenmoore et al. | 239/127.3 |
| 5,485,959 | A | * | 1/1996 | Wood et al. | 239/265.41 |
| 5,513,799 | A | * | 5/1996 | Mendia et al. | 239/265.41 |
| 5,667,140 | A | * | 9/1997 | Johnson et al. | 239/265.33 |
| 5,680,755 | A | | 10/1997 | Hauer et al. | |
| 5,683,034 | A | * | 11/1997 | Johnson et al. | 239/265.35 |
| 5,797,544 | A | * | 8/1998 | Ward | 239/265.37 |
| 5,813,611 | A | * | 9/1998 | Cires et al. | 239/265.37 |
| 5,839,663 | A | * | 11/1998 | Broadway et al. | 239/265.35 |
| 5,893,518 | A | * | 4/1999 | Bruchez et al. | 239/265.39 |
| 6,102,307 | A | * | 8/2000 | Elorriaga et al. | 239/265.39 |
| 6,192,671 | B1 | * | 2/2001 | Elorriaga | 60/230 |
| 6,658,854 | B1 | * | 12/2003 | Senile et al. | 60/771 |
| 6,745,570 | B1 | * | 6/2004 | Renggli et al. | 60/771 |

FOREIGN PATENT DOCUMENTS

EP  0 644 325 A1  3/1995
EP  0 715 067 A2  6/1996

* cited by examiner

Primary Examiner—William H. Rodriguez
(74) Attorney, Agent, or Firm—Rothwell, Figg, Ernst & Manbeck, P.C.

(57) ABSTRACT

In a variable-section turbomachine nozzle, a plurality of flexible follower flaps are provided that are interposed between adjacent controlled flaps against which the follower flaps are held by fastener means, each follower flap comprising a plurality of independent transverse boxes mounted side by side in a support sheet, the boxes contacting one another via their longitudinal edges and being held in the support sheet via their lateral edges which are engaged in the longitudinal edges of the support sheet, which longitudinal edges define respective bearing zones for bearing against the adjacent controlled flaps.

20 Claims, 4 Drawing Sheets

FLEXIBLE FLAP FOR A VARIABLE-SECTION TURBOMACHINE NOZZLE

FIELD OF THE INVENTION

The present invention relates to the general field of variable-section nozzles for turbomachines and it relates more particularly to nozzles constituted by a ring of flaps.

PRIOR ART

A conventional architecture for a variable-section turbomachine nozzle 10 is shown in FIG. 7. In that type of architecture, it is known that variable-section nozzles made up of a ring of flaps comprise both controlled flaps 12, 14 and follower flaps 16.

The controlled flaps are actuated directly by control means so as to modify the profile of the primary flow through the turbomachine engine (i.e. the exhaust section or sections depending on whether the nozzle is a converging only nozzle or whether it is a converging/diverging nozzle). Depending on the intended configuration, the control means comprise a control actuator 18 associated with a linkage of greater or lesser complexity implementing levers 20 and swiveling link forks 22, or a ring with cams and cam-follower wheels, for example.

The follower flaps are disposed radially inside the controlled flaps and bear against the adjacent controlled flaps on either side of their longitudinal edges, thereby acting, while the nozzle is in operation, and whatever the size of its through section, to provide continuity (and sealing) for the primary stream (which is why such follower flaps are also known as sealing flaps).

Depending on the accuracy of the control means, and in particular of the linkage, more or less pronounced deformations appear in operation, leading to considerable offsets in the deflections of the various controlled flaps, i.e. between the angles that these controlled flaps make relative to the axis of the engine.

This leads to considerable stresses (in bending/twisting) on the follower flaps whose two longitudinal edges (parallel to the axis of the nozzle) then need to bear on supporting lines that are not coplanar. Unfortunately, the follower flaps cannot deform sufficiently to bear against both of the adjacent controlled flaps, particularly when the follower flaps are short and made as single pieces, as shown in the example of FIG. 7, so a cantilevered-out phenomenon occurs in association with each of the follower flaps, leading to lateral leakage 26 from the primary flow, thereby diminishing the aerodynamic performance of the turbomachine (FIG. 8).

OBJECT AND DEFINITION OF THE INVENTION

An object of the present invention is thus to mitigate those drawbacks by proposing a follower flap structure that is sufficiently flexible to accommodate the offsets between the controlled flaps. Another object of the invention is to provide a flexible follower flap that is nevertheless capable of withstanding high loads in terms of pressure and temperature.

These objects are achieved by a flexible follower flap for a variable-section turbomachine nozzle, the flap being interposed between two adjacent controlled flaps against which it is held by fastener means, the flap comprising a plurality of independent transverse boxes mounted side by side in a support sheet, the boxes being in contact with one another via their raised longitudinal edges and being held in the support sheet by their lateral edges which are engaged in longitudinal edges of the support sheet.

With this particular structure, leakage between flaps is almost completely eliminated as are the stresses associated with deformation. The lifetime of the flaps is increased and their manufacturing cost is reduced.

The longitudinal edges of the support sheet engaging the lateral edges of the boxes define respective bearing zones for bearing against the adjacent controlled flaps, and they include holding notches for holding the transverse boxes in position, each notch receiving the ends of the raised longitudinal edges of two adjacent boxes.

Advantageously, one of the boxes of said plurality of transverse boxes further comprises a transverse holder strip for holding the follower flap in a rest position. The holder strip constitutes the terminal transverse arm of a short upright extending radially from a longitudinal edge of said transverse box.

Preferably, the transverse box is an end transverse box of the follower flap and the support sheet is constituted by a metal plate of a material that is relatively flexible and that withstands high temperatures.

The invention also provides a variable-section turbomachine nozzle including a plurality of flexible follower flaps as specified.

BRIEF DESCRIPTION OF THE DRAWINGS

The characteristics and advantages of the present invention will appear better on reading the following non-limiting description made by way of indication and with reference to the accompanying drawings, in which.

DETAILED DESCRIPTION OF A PREFERRED EMBODIMENT

Figure 1:
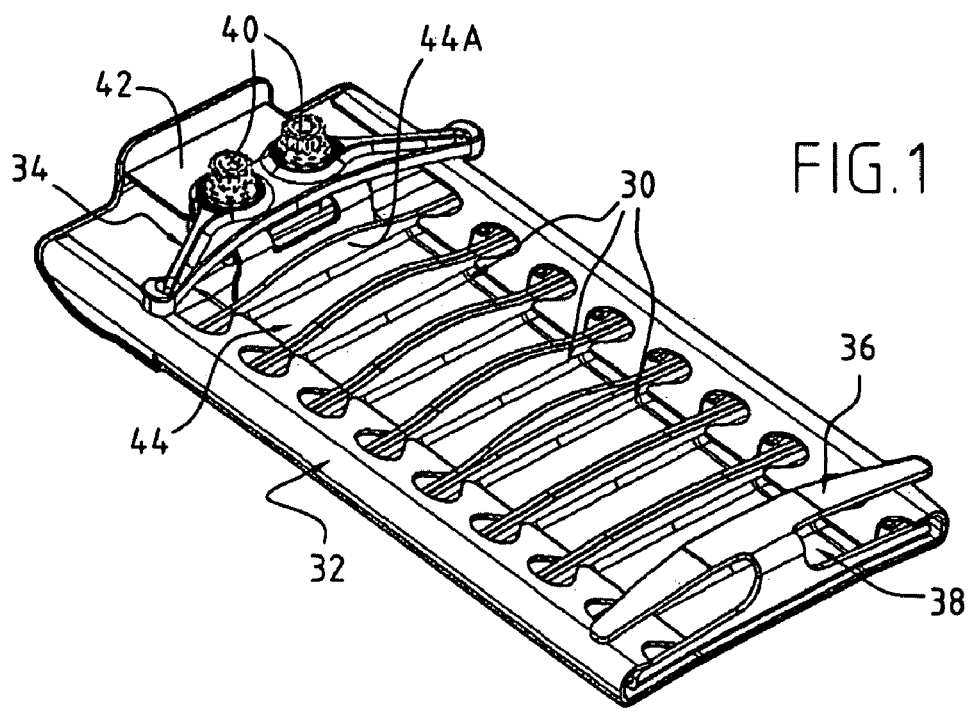
FIG. 1 is a perspective view showing a flexible follower flap of the invention.

FIG. 1 is a perspective view of a follower flap structure in accordance with the present invention. This flap is said to be "flexible" because of its ability to deform, and it comprises a plurality of independent boxes 30 held side by side in a support sheet 32 that also acts to provide sealing for the stream of hot gas. The follower flap is connected to two adjacent controlled flaps via two holder strips, an upstream strip 34 disposed substantially at its theoretical hinge axis and serving to position the follower flap in the nozzle, and a downstream strip 36 disposed substantially at its free end remote from its theoretical hinge axis and serving to hold the flap in its rest position (engine turned off).

Each box 30 is rectangular in shape with two longitudinal edges (or flanges) 30A (extending in the long direction of the box) that are raised to perform a stiffening function for the box, and two lateral edges 30B (short sides) that are folded over and that serve to be engaged in the sealing sheet.

The number of these boxes and their stiffness depend on the characteristics desired for the nozzle, and in particular they are optimized as a function of: the pressure and temperature acting on the flap; its dimensions; the materials used; the cantilever to be filled in; and the height available to ensure that the ends of the longitudinal edges of the boxes do not interfere with the controlled flaps.

Advantageously, the end box 38 (i.e. the box located at the free end of the follower flap) includes the downstream holder strip 36 of the follower flap. To do this, the outermost longitudinal edge 38A of this box is extended in its center by a short vertical upright 38B extending radially outwards relative to the nozzle and terminated by a transverse arm 38C constituting the holder strip. This holder arm is of a length that is greater than the width of the follower flap so that its two ends 38D can come into contact with the two controlled flaps on either side of the follower flap.

The sealing sheet is constituted by a metal plate of relatively flexible material that withstands high temperatures (greater than 1000° C.), it is rectangular in shape and of dimensions that are compatible with the empty space to be filled in between two controlled flaps. More precisely, the follower flap is of a width that is greater than said empty space so as to create respective overlap zones at each of its two longitudinal edges corresponding to zones where the follower flap bears against a controlled flap.

The longitudinal edges 32A of the sealing sheet are curved (upturned) so as to receive the folded-over lateral edges 30B of the boxes 30, and they include notches 32B that are regularly spaced apart to receive the ends of the longitudinal edges 30A of two adjacent boxes and thus hold them together. The contiguous longitudinal edges 30A of two adjacent boxes providing the rigidity of said boxes are thus free to slide one on the other.

This flap configuration enables functions to be completely dissociated. Firstly the boxes constitute the structure of the flap and provide it with its ability mechanically to withstand pressure forces. When the flap twists, the boxes move relative to one another, while they are themselves subjected to very little deformation. The mere fact of imposing displacements on the flap therefore generates practically no stresses in the boxes. Secondly, the sheet serves merely to provide sealing between the boxes and improves the shape of the stream flowing through the engine. The sheet also serves to hold the boxes together along the edges without performing any structural role.

The follower flap is positioned relative to the two controlled flaps on either side thereof by the upstream holder strip 34 which is fixed to the sealing sheet 32 by means of at least one screw 40, for example. In the example shown, which is not limiting in any way, this holder strip is fixed to a bridge-forming metal support 42 that has one side welded to one end of the sealing sheet and that has its other side bearing against one of the longitudinal edges 44A of the first box 44 of the follower flap, like a clamp. Naturally, any other separable means enabling the flap to be installed quickly in the nozzle could be envisaged.

Figure 2:
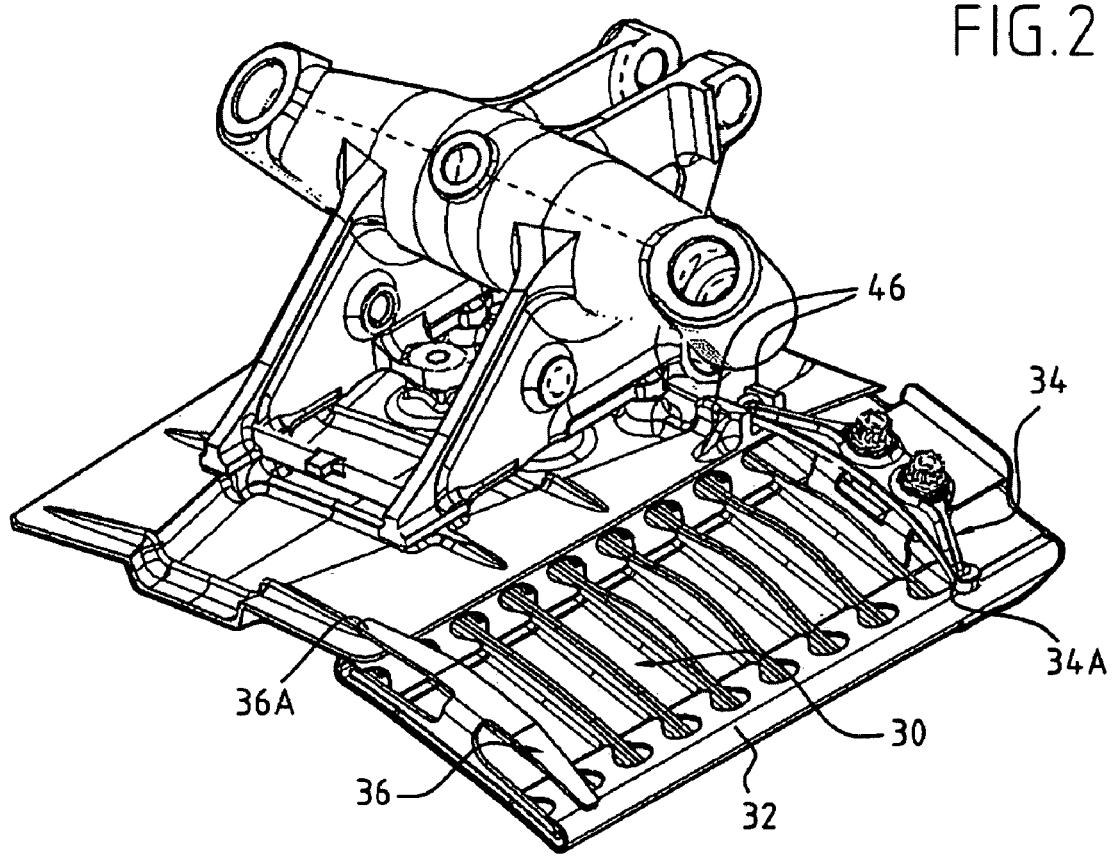
FIG. 2 is a perspective view showing the FIG. 1 flexible follower flap bearing against a controlled flap of a variable-section nozzle.

FIG. 2 shows how the follower flap is attached to one of the two controlled flaps that are adjacent thereto. This takes place firstly via the upstream holder strip 34 that is curved like a coat hanger with each end 34A carrying a cylindrical stud held in position between two lugs 46 disposed on the outside longitudinal edge of the controlled flap on either side of said end in order to limit its lateral displacement (i.e. along the axis of the nozzle) while still allowing it to move with two degrees of freedom (in rotation and in longitudinal translation), and secondly via the downstream holder strip 36 whose end 36A merely rests on the outer longitudinal edge of the corresponding controlled flap. By means of this configuration, the boxes support the sealing sheet in full, and the flap can withstand forces that are large.

Figure 3:
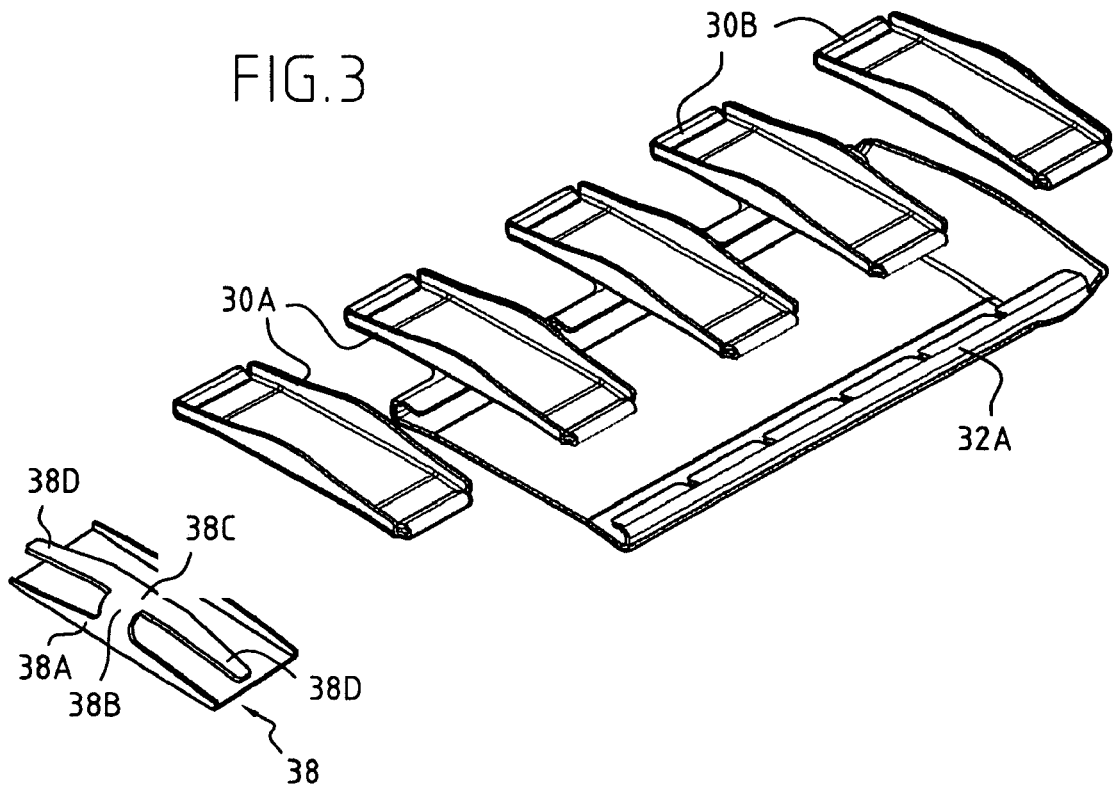
FIG. 3 is an exploded view of the FIG. 1 flexible follower flap.
Figure 3A:
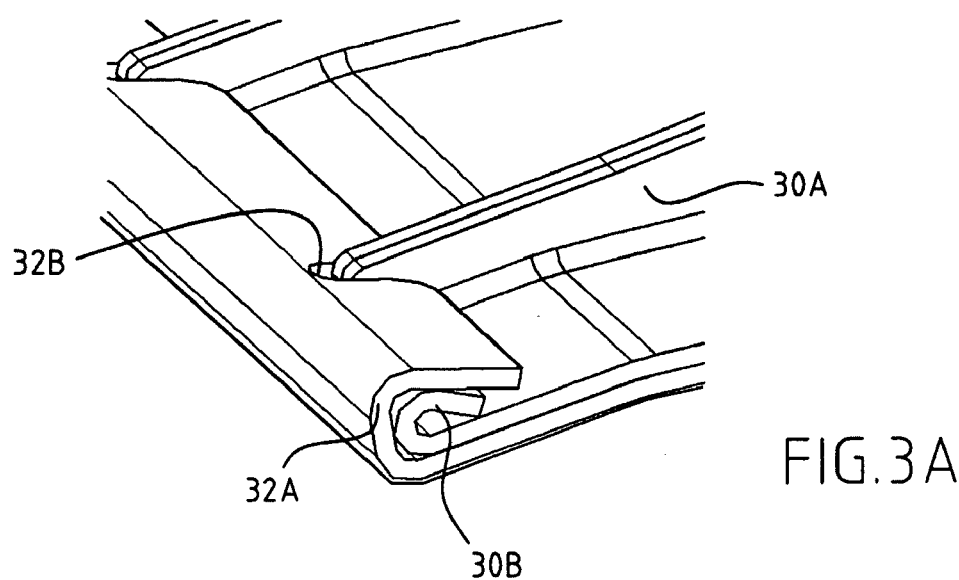
FIG. 3A show a detail of the FIG. 1 flexible follower flap.

FIGS. 3 and 3A show various steps in assembling a follower flap. The boxes are made individually from sheet metal plates which are folded to form the folded-over edges and the raised edges of the boxes, the end box being shaped to include the downstream holder strip 36. The sealing sheet is itself made from a plate of sheet metal whose longitudinal edges are notched and then folded up so as to receive and guide the various boxes that are to make up the flap. Once these boxes have been slid one by one onto the metal sheet, the ends of the longitudinal edges of the various boxes are put into register with the notches and the longitudinal edges of the sheet folded over further in order to ensure that the boxes are properly secured, as shown in FIG. 3A. The assembly can then be mounted between two controlled flaps, with the flaps being mutually fastened by subsequently putting the upstream holder strip into place.

Figure 4:
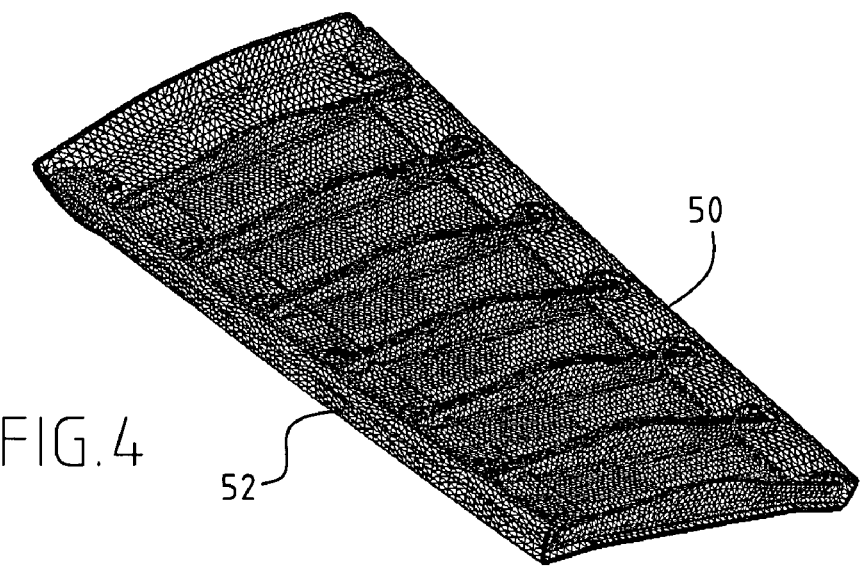
FIGS. 4, 5, and 6 are views showing the deformation in operation of the FIG. 1 flexible follower flap.
Figure 5:
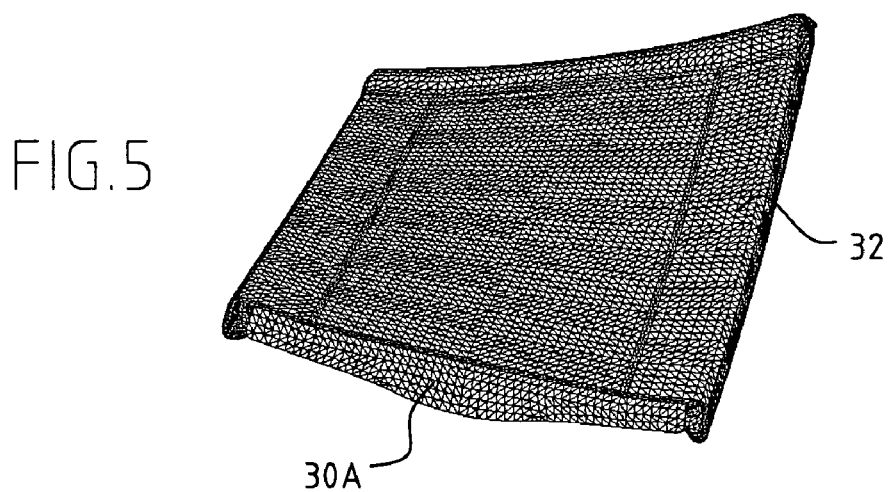
Figure 6:
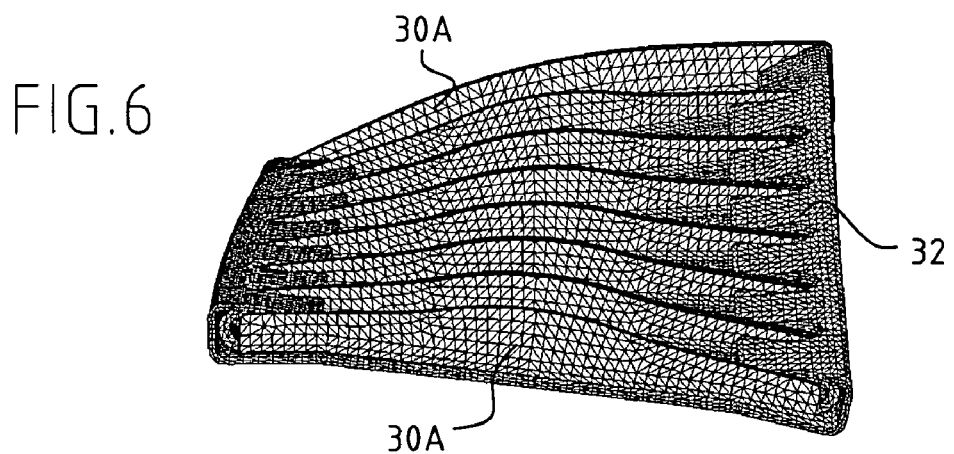
Figure 7:
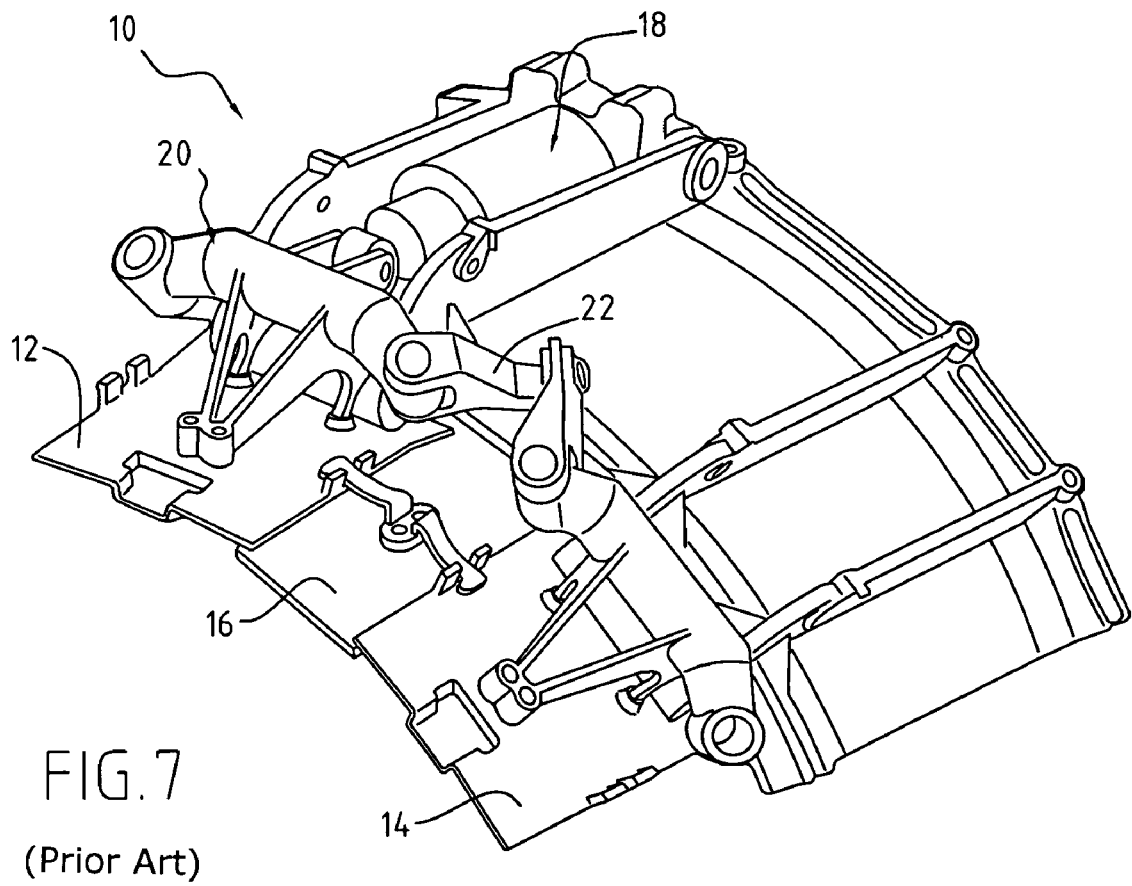
FIG. 7 is a fragmentary perspective view of a prior art variable-section nozzle.
Figure 8:
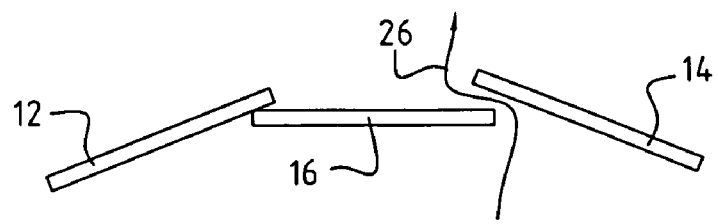
FIG. 8 is a diagram showing leakage between flaps as exists with the FIG. 7 nozzle.

The operation of the flexible follower flap of the invention is described below with reference to FIGS. 4 to 6 which show the deformations to which the flap is subjected (the curved holder strips being omitted for ease of understanding). Under the effect of pressure from the hot gases exhausted through the nozzle, the follower flap deforms since its bearing surfaces against the adjacent controlled flaps are offset. On one side, the follower flap bears against a controlled flap along a rectilinear supporting line 50, while on the other side the boxes move relative to one another in order to keep in contact with the other controlled flap 52 which is offset. The boxes are sufficiently stiff to withstand the pressure forces, and they are held in place by the sealing sheet. Since this sheet is flexible, it tracks the movements of the moving parts and warps so as to press as closely as possible against the boxes of the flap in order to ensure that the exhaust stream has a smooth aerodynamic profile. Thus, the deformation to which the flexible flap needs to be subjected is obtained by accumulating small displacements between moving parts (the boxes), thereby avoiding generating stresses due to the deformation. The lifetime of the flap is improved correspondingly.

The flexible follower flap of the invention thus facilitates displacement between boxes so as to avoid stresses in the parts of the flap. It is because the boxes are juxtaposed so that they are free to move relative to one another while remaining contiguous. The sealing sheet is held solely along its longitudinal edges. Being subjected to high pressure, each box can bear against the adjacent flaps, so the sheet itself is lightly loaded, being pressed against the boxes.

This structure thus satisfies two opposing requirements for bending strength or second moment of area (by means of the boxes) and for flexibility (by means of the sealing sheet), and the functions of withstanding pressure and providing sealing are separated. This achieves a good compromise between relative displacement between the boxes (no stresses are generated) and the level of mechanical stress that results from the displacements that are imposed (the flap is twisted). This structure is thus particularly suitable for being applied to variable-section nozzles, both those comprising a short converging portion, and those also provided with a diverging portion.

What is claimed is:

1. A flexible follower flap for a variable-section turbomachine nozzle, the flexible follower flap being interposed between two adjacent controlled flaps against which it is held by fastener means, the flexible follower flap comprising a plurality of independent transverse boxes mounted side by side in a support sheet, the boxes being in contact with one another via their raised longitudinal edges and being held in the support sheet by their lateral edges which are engaged in longitudinal edges of the support sheet.

2. A flexible follower flap according to claim 1, wherein said longitudinal edges of the support sheet engaging the lateral edges of the boxes define respective bearing zones for bearing against the adjacent controlled flaps.

3. A flexible follower flap according to claim 1, wherein said longitudinal edges of the support sheet include holding notches for holding the transverse boxes in position, each notch receiving the ends of the raised longitudinal edges of two adjacent boxes.

4. A flexible follower flap according to claim 1, wherein one of the boxes of said plurality of transverse boxes further comprises a transverse holder strip for holding the follower flap in a rest position.

5. A flexible follower flap according to claim 4, wherein said holder strip constitutes the terminal transverse arm of a short upright extending radially from a longitudinal edge of said transverse box.

6. A flexible follower flap according to claim 4, wherein said transverse box is an end transverse box of the follower flap.

7. A flexible follower flap according to claim 1, wherein said support sheet is constituted by a metal plate of a material that is relatively flexible and that withstands high temperatures.

8. A variable-section turbomachine nozzle including a plurality of flexible follower flaps according to claim 1.

9. A flexible follower flap for a variable-section turbomachine nozzle, said flexible follower flap comprising:
a plurality of independent transverse boxes, each of said boxes including raised longitudinal edges and lateral edges; and
a support sheet having longitudinal edges, wherein said boxes are mounted side by side in said support sheet with said boxes being in contact with one another via their raised longitudinal edges and being held in said support sheet by their lateral edges which are engaged in said longitudinal edges of said support sheet.

10. A flexible follower flap according to claim 9, wherein said longitudinal edges of the support sheet engaging the lateral edges of the boxes define respective bearing zones for bearing against an adjacent controlled flap.

11. A flexible follower flap according to claim 9, wherein said longitudinal edges of the support sheet include holding notches for holding the transverse boxes in position, each notch receiving the ends of the raised longitudinal edges of two adjacent boxes.

12. A flexible follower flap according to claim 9, wherein one of the boxes of said plurality of transverse boxes further comprises a transverse holder strip for holding the follower flap in a rest position.

13. A flexible follower flap according to claim 12, wherein said holder strip constitutes the terminal transverse arm of a short upright extending radially from a longitudinal edge of said transverse box.

14. A flexible follower flap according to claim 12, wherein said transverse box is an end transverse box of the follower flap.

15. A flexible follower flap according to claim 9, wherein said support sheet is flexible.

16. A variable-section turbomachine nozzle including a plurality of flexible follower flaps according to claim 9.

17. A flexible follower flap for a variable-section turbomachine nozzle, said flexible follower flap comprising:
a plurality of independent transverse components, each of said components comprising two raised longitudinal edges and two lateral edges; and
a support sheet comprising two longitudinal edges with spaced-apart notches formed along each of the longitudinal edges,
wherein each of said components is held in said support sheet by engagement of the lateral edges of said component and the longitudinal edges of said support sheet, and wherein each of said notches formed said longitudinal edges of said support sheet receives a portion of the raised longitudinal edges of adjacently positioned components.

18. A flexible follower flap according to claim 17, wherein said longitudinal edges of the support sheet engaging the lateral edges of the components define respective bearing zones for bearing against adjacent controlled flaps.

19. A flexible follower flap according to claim 17, wherein one of the components of said plurality of transverse components further comprises a transverse holder strip for holding the follower flap in a rest position.

20. A variable-section turbomachine nozzle including a plurality of flexible follower flaps according to claim 17.

* * * * *